US008467676B2

(12) United States Patent
Villarruel et al.

(10) Patent No.: US 8,467,676 B2
(45) Date of Patent: Jun. 18, 2013

(54) SPARING FOR MULTI-WAVELENGTH OPTICAL TRANSMITTER (75) Inventors: Fernando Xavier Villarruel, Romeoville, IL (US); Kuang-Yi Wu, Bolingbrook, IL (US); Fred S. Hirt, Brookfield, IL (US)

(73) Assignee: Cisco Technology, Inc., San Jose, CA (US)

( * ) Notice: Subject to any disclaimer, the term of this patent is extended or adjusted under 35 U.S.C. 154(b) by 670 days.

(21) Appl. No.: 12/355,220

(22) Filed: Jan. 16, 2009

(65) Prior Publication Data

US 2010/0183294 A1   Jul. 22, 2010

(51) Int. Cl.
H04B 10/12 (2006.01)
H04B 10/08 (2006.01)
H04J 14/02 (2006.01)

(52) U.S. Cl.
USPC .............. 398/10; 398/192; 398/91; 398/7

(58) Field of Classification Search
USPC ........................... 398/7, 10, 91, 192
See application file for complete search history.

(56) References Cited

U.S. PATENT DOCUMENTS

| 5,436,749 | A  | * | 7/1995  | Pidgeon et al. ............. 398/193 |
| 5,940,196 | A  | * | 8/1999  | Piehler et al. ................ 398/91 |
| 6,459,832 | B1 |   | 10/2002 | Smith et al. |
| 6,538,789 | B2 |   | 3/2003  | Sun |
| 6,631,019 | B1 | * | 10/2003 | Vujkovic-Cvijin et al. .. 398/195 |
| 6,895,159 | B1 |   | 5/2005  | Martin, Jr. et al. |
| 6,915,075 | B1 | * | 7/2005  | Oberg et al. ................... 398/9 |
| 6,978,059 | B2 |   | 12/2005 | Martin, Jr. et al. |
| 6,985,020 | B2 |   | 1/2006  | Zhou |
| 7,212,738 | B1 | * | 5/2007  | Wang .............................. 398/2 |
| 7,233,738 | B2 |   | 6/2007  | Kerfoot, III |
| 7,272,309 | B1 |   | 9/2007  | Tamil et al. |
| 7,978,982 | B2 | * | 7/2011  | Hosking ...................... 398/147 |
| 2002/0145778 | A1 |   | 10/2002 | Strasser et al. |
| 2005/0018953 | A1 |   | 1/2005  | Martin, Jr. et al. |
| 2006/0024058 | A1 |   | 2/2006  | Nabeyama et al. |
| 2006/0045520 | A1 | * | 3/2006  | Nakano et al. .................. 398/33 |
| 2008/0298805 | A1 | * | 12/2008 | Lee et al. ........................ 398/48 |

OTHER PUBLICATIONS

PCT International Search Report—3 pgs., Apr. 22, 2010, Cisco Technology, Inc.
PCT Written Opinion of the International Searching Authority—7, Apr. 22, 2010, Cisco Technology, Inc.
Mary R. Phillips, et al., "Four-Wave-Mixing-Induced Crosstalk and Distortion in Subcarrier-Multiplexed Lightwave Links: Theory and Measurement", Journal of Lightwave Technology, vol. 26. No. 15, Aug. 1, 2008, pp. 2647-2652.

(Continued)

*Primary Examiner* — Yuanda Zhang
*Assistant Examiner* — Michael Carter
(74) *Attorney, Agent, or Firm* — Tarolli, Sundheim, Covell & Tummino LLP (57) ABSTRACT

A multi-wavelength optical transmission system includes a plurality of primary optical transmitters, each being configured to provide directly modulated analog optical signals at non-uniformly spaced apart wavelengths. An optical multiplexer having a plurality of optical input ports receives the analog optical signals from each of the plurality of primary optical transmitters and provides a wavelength division multiplexed signal over an optical fiber coupled at an output thereof. A spare optical transmitter is coupled to an input port of the optical multiplexer and, in response to detecting failure of a failed one of the plurality of primary optical transmitters, is tuned to provide a directly modulated analog optical signal at a spare wavelength that is selected as to be non-uniformly spaced relative to at least some of the non-uniformly spaced apart wavelengths according to tuning data.

20 Claims, 7 Drawing Sheets

OTHER PUBLICATIONS

Fabrizio Forghieri, "WDM Systems with Unequally Spaced Channels", Journal of Lightwave Technology,. vol. 13, No. 5, May 1995, pp. 889-897.

M. R. Phillips, et al., "FWM-Induced Crosstalk and Distortion in Subcarrier-Multiplexed Lightwave Links: Theory and Measurement", Submitted to Journal of lightwave Technology, Special Issue on Microwave Photonics, Jan. 29, 2008, pp. 1-7.

* cited by examiner

SPARING FOR MULTI-WAVELENGTH OPTICAL TRANSMITTER

TECHNICAL FIELD

The invention relates generally to optical fiber communications and, more particularly, to a system and method that can be utilized to provide sparing with an analog multi-wavelength optical transmitter.

BACKGROUND

Many optical fiber communication systems today transmit data over long distances with higher data rates or with a larger number of data channels. To help reduce the capital and operating costs associated with transmitting data, such systems are currently being built to transmit data, video and voice over these longer distances without employing optical regeneration or other forms of repeaters. The transmission capacity of a fiber depends on the modulation format utilized, transmission and reception equipment utilized, as well as the intrinsic properties of the fiber itself, including its length. Certain effects, such as chromatic dispersion, waveguide dispersion, Four-Wave Mixing (FWM), Raman Coupling, and Stimulated Brillouin Scattering increase as a strongly nonlinear function of the length of the fiber, which further tends to lower the achievable transmission rate. To transmit the greatest amount of information per fiber—specifically in the case of information which is frequency-division formatted so as to fit within discrete "channels"—the greatest number of channels in an optical system, while maintaining signal integrity over all of the channels, the optical transmitter should also be substantially linear and free of distortion.

To increase capacity over a fiber communication link, multi-wavelength transmission using wavelength division multiplexing (WDM) techniques has become relatively straightforward for transmission of digital data. For instance, multiplexing circuits can perform passive WDM and dense WDM (DWDM) multiplexing of multiple optical signals, such as to enable transmission of well over eighty optical signals at selected wavelengths in the 1400-1600 nm window. However, for certain industries, including but not limited to cable television (CATV) distribution systems that send bandwidth intensive media (e.g., audio and video information) utilizing highly bandwidth efficient, complex modulation (e.g., Quadrature Amplitude Modulation (QAM)), traditional baseband digital (e.g., On-Off-Keying (OOK)) transmission via WDM is considered inadequate due to the very inefficient bandwidth use associated with such transmission's operation. That is, traditional baseband digital schemes are no where near as bandwidth efficient as QAM and other forms of complex modulation, so that they effectively limit the useable bandwidth of a given fiber.

Initially, in the CATV field the DWDM wavelengths carried just eight RF quadrature amplitude modulation (QAM) narrowcast channels, containing a mix of video, high-speed data and voice, to each node, overlaid (that is linearly added in a RF channel-by-channel sense) above those frequencies already occupied by a tier of (typically 80) RF analog video carriers. While DWDM is more widely deployed, it has primarily been a bandwidth expansion tool for cable operators that had standardized on 1550 nm hybrid fiber/coax (HFC) networks. However, such systems tend to be limited by distortion and crosstalk, which can significantly degrade the carrier-to-noise ratio (CNR), which is a useful metric ultimately determining the Bit Error Ratio (BER) of the QAM data streams delivered.

Another approach for the cable television (CATV) distribution fiber plant employs DWDM transmission in the O-band via a standard single-mode fiber. Wavelength-division multiplexing allows logical segmentation of nodes while the 1310-nm wavelength allows the use of directly modulated diode lasers as transmitters, with the attendant lower complexity and lower cost. Because the chromatic dispersion is low, especially near 1310 nm, significant conversion of phase (frequency) modulation to amplitude modulation, which is a source of composite-second order (CSO), composite triple-beat (CTB), and cross-modulation distortion (XMD), is not the major contributor to nonlinear distortions. Despite the advantages associated with direct modulation in the O-band, four-wave mixing (FWM) is phase-matched or nearly phase-matched often resulting in large FWM products, such as crosstalk and other distortion, being generated. Raman coupling is also responsible for a dramatic increase in the noise coupled the analog modulation on each wavelength, greatly reducing the Carrier to Noise ratio (CNR). Thus, FWM must be accommodated to achieve desirable CNR in such a DWDM system. Raman coupling must be carefully avoided also to prevent debilitating loss of CNR.

Because of the inherent complexity and cost associated with implementing multi-channel WDM systems for optical transmission of complex modulated signals, such as for CATV distribution, there is further need for an approach that can effectively implement sparing for a failed transmitter.

SUMMARY

The invention relates generally to communications and, more particularly, to a system and method that can be utilized to provide sparing with a multi-wavelength optical transmitter.

One embodiment of the invention provides a multi-wavelength optical transmission system. The system includes a plurality of primary optical transmitters, each being configured to provide directly modulated analog optical signals at non-uniformly spaced apart wavelengths. An optical multiplexer having a plurality of optical input ports receives the analog optical signals from each of the plurality of primary optical transmitters and provides a wavelength division multiplexed signal over an optical fiber coupled at an output thereof. A spare optical transmitter is coupled to an input port of the optical multiplexer and, in response to detecting failure of a failed one of the plurality of primary optical transmitters, is tuned to provide a directly modulated analog optical signal at a spare wavelength that is selected as to be non-uniformly spaced relative to at least some of the non-uniformly spaced apart wavelengths according to tuning data.

Another embodiment of the invention provides a transmission system for providing dense wavelength division multiplexing transmission of unequally spaced wavelengths in the optical O-band over a single optical fiber of a cable television distribution plant. The system includes a plurality of primary optical transmitters, each of the primary optical transmitters receiving a respective radio frequency (RF) input signal and directly modulating the RF input signal to a corresponding one of the unequally spaced wavelengths in the O-band. A switch is connected to receive each of the RF input signals, the switch selectively connecting the RF signal input for a given one of the plurality of primary optical transmitters to a switch output of the switch. A tunable spare analog optical transmitter is connected to receive the RF signal at the switch output, the spare analog optical transmitter being controlled to operate in response to detecting a failure in one of the plurality of primary optical transmitters. The spare analog optical transmitter is configured to directly modulate the RF signal at the switch output in response to a sparing control signal to provide a corresponding analog optical signal at an output thereof at a wavelength in the O-band that is unequally spaced with respect to the wavelengths of the plurality of primary optical transmitters and at a power level that depends on the sparing control signal. The sparing control signal can vary based on which of the plurality of primary optical transmitters the failure has been detected.

Yet another embodiment provides a method for sparing a plurality of O-band optical transmitters in a cable distribution plant, each of the O-band optical transmitters receiving a respective complex modulated radio frequency (RF) input signal and directly modulating the RF input signal to a corresponding analog optical signal, each of the corresponding analog optical signals having unequally spaced wavelengths in the O-band. The method includes detecting a failure in one of the plurality of O-band optical transmitters and activating a spare optical transmitter to receive the RF input signal provided to the failed one the plurality of O-band optical transmitters. The spare optical transmitter is tuned based on feedback to directly modulate the RF input signal provided to the failed one the plurality of O-band optical transmitters to provide an analog optical signal having a spare wavelength in the O-band that is unequally spaced relative to the wavelengths of the corresponding analog optical signals.

DESCRIPTION OF EXAMPLE EMBODIMENTS

The invention relates to systems and methods to provide sparing for a multi-wavelength transmission system. In one embodiment, the multi-wavelength system performs dense wavelength division multiplexing DWDM in the O-band (1260 nm to 1360 nm), and includes a plurality of optical transmitters. Each of the optical transmitters transmits an analog-modulated optical signal at unequally spaced wavelengths. That is, the frequencies of the transmitted optical signals are not implemented or spaced according to the International Telecommunication Union (ITU) Grid or other standards, which establishes uniform channel spacing for CWDM and DWDM wavelengths.

For example, each of the wavelengths of the multi-wavelength transmission system can be spaced according to the teachings of F. Forghieri, R. W. Tkach, and A. R. Chraplyvy, *WDM Systems with Unequally Spaced Channels*, Journal of Lightwave Technology, Vol. 13, No. 5, p. 889, May 1995, which is incorporated herein by reference. This paper discloses an algorithm that can be utilized to choose wavelengths of a multi-wavelength system so that the four-wave mixing (FWM) products fall substantially harmlessly in the spaces between the desired channels. The solution can be summarized as finding a Golomb ruler in which the spacing wavelengths is greater than a positive integer and which minimizes the total optical bandwidth. By defining the upper and lower bounds to the O-band and by dividing this bandwidth into equal slots of bandwidth to allow adequate rejection of undesired channels, the wavelength plan can be reduced to a corresponding integer linear programming problem.

Sparing is implemented for such system by providing a tunable spare optical transmitter having an analog linearly-modulated laser that can be tuned to provide sparing at a suitable wavelength and power to replace a failed one of the other plurality of optical transmitters. The tuning can include tuning in the electrical domain, the optical domain or tuning in both the optical and electrical domains. For example, the spare optical transmitter thus can be optically tuned to the same or different wavelength that is unequally spaced relative to the remaining wavelengths. Optical attenuation can also be performed (e.g., corresponding to additional tuning in the optical domain). Electrical tuning of the spare optical transmitter can further include tuning an optical power level as well as and setting the linearization correction parameters (e.g., predistortion coefficients, and dispersion compensation). This tuning further can vary depending on any shift in the transmission laser's wavelength, and thus should be compensated accordingly, such that the spare transmitter can operate functionally equivalent to the failed optical transmitter.

In one embodiment, a linearized analog tunable spare transmitter can be pre-configured to operate at a discrete number of plural wavelengths, one of which can be selected based on sparing control that depends on which of the primary optical transmitters has failed. To facilitate programming the tunable spare transmitter, systems and methods can include means for monitoring the network to ascertain which of a plurality of primary optical transmitters may have failed. The monitoring can also be employed to ascertain an indication of non-linearities associated with the laser being replaced, including composite second order (CSO), composite triple beat (CTB), cross-modulation (XMD) or higher order distortions of that optical transmitter being replaced. The monitored parameters can be utilized for tuning operating parameters of the spare transmitter.

Figure 1:
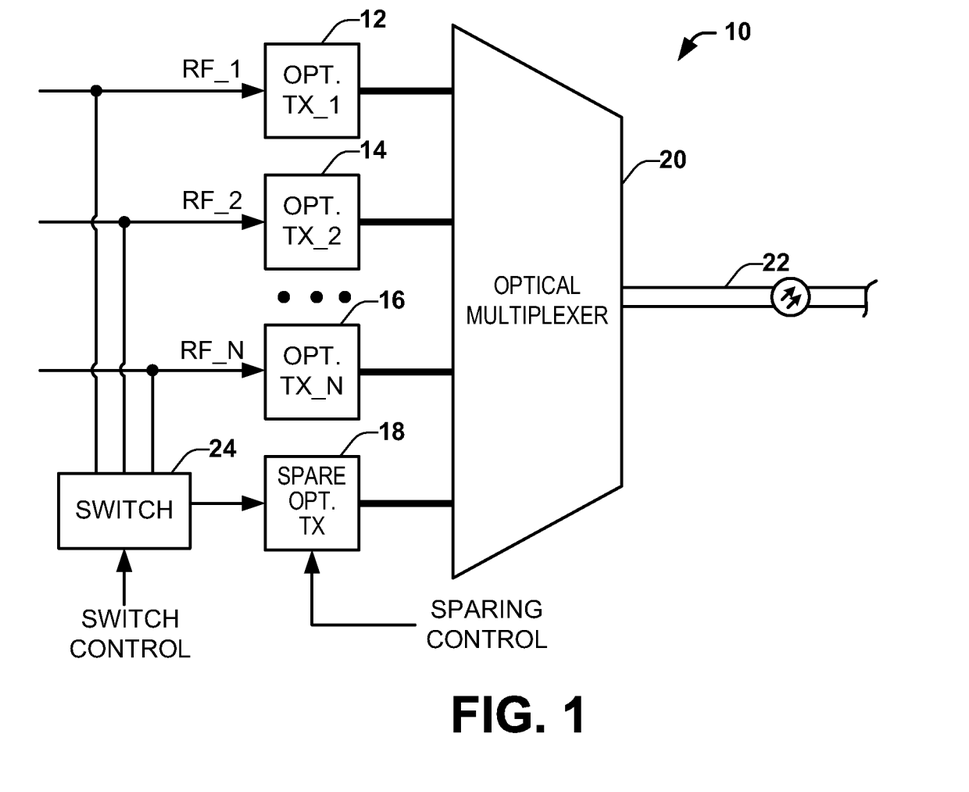
FIG. 1 depicts an example of an optical transmission system that can be implemented according to an embodiment of the invention.

FIG. 1 depicts an example of a transmission system 10 that can implement transmitter sparing according to an embodiment of the invention. The system 10 includes a plurality of primary optical transmitters 12, 14 and 16 indicated at optical transmitter 1 through N, where N is a positive integer denoting the number of primary transmitters. The system 10 also includes a spare transmitter 18 that is configured to provide sparing for the transmission system 10 in response to the sparing control signal. The primary transmitters 12, 14 and 16 are each coupled to an optical multiplexer 20. The optical multiplexer 20 is configured to perform wavelength division multiplexing (WDM) of the optical signals from each of the respective transmitters 12, 14, and 16 in order to provide a dense WDM signal over an optical fiber 22 that is coupled to the multiplexer. For example, the fiber 22 can be implemented as a single mode fiber (e.g., implemented according to the ITU G.652 standard) that provides a fiber link to a receive end of the associated CATV distribution system.

In one embodiment, each of the optical transmitters 12, 14 and 16 includes a linearized, predistortion-corrected, tunable laser configured so as to be directly modulated (e.g., both as to frequency and amplitude) in order to produce an analog optical signal at a predetermined laser wavelength, such as in the O-band. Each of the wavelengths of the respective transmitters 12, 14 and 16 is set according to a wavelength plan in which the wavelengths are unequally spaced apart such as described in the above-incorporated Forghieri paper. It would be understood and appreciated that such an unequal spacing helps to mitigate optical fiber non-linearities that affect analog transmission, including CSO, CTB, and XMD distortions as well as suppression of Raman-induced noise. It will be understood that for a CATV distribution system, many specifications require suppression of the CSO below −60 dB. Any further decrease of CSO below this level is significant in the industry since each dB further allows a user to increase the bandwidth of transmission by a substantial amount. Such an increase in bandwidth further translates to real value because more bandwidth enables additional content to be distributed over the same optical fiber 22.

Due to the tightly controlled wavelength plan associated with the primary optical transmitters 12, 14 and 16, the concept of sparing becomes even more complicated when a single optical spare transmitter 18 is utilized for sparing the failure of any of the primary optical transmitters 12, 14 and 16, such as shown and described herein. Therefore, the sparing control signal provided to the spare optical transmitter 18 can be utilized to control various attributes of the spare transmitter 18 including its wavelength and various functional operating characteristics. As an example, the sparing control signal can control the wavelength of the spare transmitter and the output power that is coupled to the fiber 22 through the optical multiplexing 20 as well as implement other aspects of optical and/or electrical tuning.

As a further example, a monitoring and control system can monitor and control various parameters for the spare transmitter 18. For instance, the spare transmitter 18 can also be dynamically tunable, relative to the desired target spare wavelength, such as in ±0.1 increments based on the sparing control. The spare optical transmitter 18 further can be tunable to maintain interoperability with the transmission system 10 as well as with components at a receivers system to which the optical fiber 22 may be coupled. The spare optical transmitter 18 may also include a variable optical attenuator that can allow for variations in laser bias current in order to maintain operation at an optical linearity condition while also maintaining substantially constant optical power at its output. Such tuning can also be performed periodically to accommodate for drift.

As mentioned herein, the spare optical transmitter 18 can be configured to be functionally equivalent with respect to the failed transmitter 12, 14 or 16. The sparing control may also be utilized to control the second-order phase signature and third-order phase signature as well as the cross-modulation distortion suppression of the laser. The sparing control may also be utilized to modify the optical adiabatic chirp characteristics of the spare optical transmitter 18, including static characteristics as well as the dynamic frequency which is dependent upon the modulation transfer ratio, such as can be measured by the change in the output wavelength per unit change in drive current over a variation in drive frequency.

Thus, by configuring the spare optical transmitter 18 to operate in the O-band linear, non-linear electrical and optical transmission parameters, such as CNR, CSO, CTB, XMD, central wavelength occupied optical spectrum, and drifts associated with such parameters over time and temperature can be comparable and substantially equivalent to those of the primary transmitter which has been replaced. Such parameters can be tuned dynamically based on feedback and implemented in the sparing control that is provided to the spare transmitter 18. Additionally, when the sparing transmitter is activated to operate in the transmission system 10, similar fine tuning of optical parameters of the remaining primary transmitters 12, 14, 16 can also be implemented to achieve improvements in CNR by mitigating CSO, CTB, and XMD.

Since it is understood that such spare transmitter 18 may operate as a temporary solution, some amount of de-rating of transmission parameters relative to the transmitter being replaced may be tolerated. However it is to be further understood that a spare tunable optical transmitter 18 that is able to be utilized as a primary solution as well as a general solution in the transmission system 10 can be implemented although likely at greater expense.

In one embodiment, the transmission system 10 also includes a switch network 24 that receives as inputs each of the plurality of radio frequency (RF) input signals provided to the primary transmitters 12, 14 and 16. The RF signals are indicated at RF_1, RF_2 through RF_N. Each of these RF input signals can be selectively electrically coupled, based on a switch control signal, to the input of the spare optical transmitter 18. Thus based on the sparing control and parameterization of the spare transmitter 18, the RF signal is amplified and directly modulated corresponding optical signal that is passed to the fiber 22 via the optical multiplexer 20. As described herein, dynamic feedback control can be utilized as part of the sparing control for further tuning of the optical parameters to mitigate the effects of four-wave mixing and other forms of distortion that might occur during use of the spare transmitter 18 in the transmission system 10.

Additionally, the tunable spare transmitter 18 can be tuned based on the sparing control signal to one of a plurality of different spare wavelengths which have been predetermined to reside at unequally spaced intervals relative to the primary optical transmitter wavelengths as to mitigate the undesirable effects of four-wave mixing as well as Raman coupling by limiting the overall wavelength span occupied by the active wavelengths plus the spare. For example, in a four-channel system (e.g., N=4), the spare optical transmitter 18 can be configured to tune one of up to four different predetermined, non-ITU gridded frequencies depending upon which of the primary optical transmitters 12, 14 through 16 has been determined to have failed. In addition to tuning the wavelength of the spare transmitter 18, the power and analog predistortion parameters can be set based on the sparing control signal depending upon which of the primary transmitters has failed as well as based on other operating characteristics associated with the primary transmitters and the WDM signal propagating over the fiber 22.

As a further example, an algorithm may be implemented by sparing control logic in response to the failure of one of the primary transmitters. The algorithm can compute (e.g., in real time) a spare wavelength and other transmission parameters, such as power and non-linearities that can be adjusted by configuring compensation and predistortion circuitry of the transmitter 18 according to the sparing control signal. Additional fine tuning of such parameters can be performed as part of an initial calibration of the spare transmitter to further reduce the effects of four-wave mixing and to increase CNR, such as based on feedback associated with the operation of the system 10. It is to be appreciated that the algorithm used in the selection of the spare wavelength can take full advantage of the fact that the system only has N−1 remaining unequally spaced wavelengths, which are in addition to the spare. This case is distinct from that of adding one additional wavelength to a system operating with its full complement of transmitters. Such fact can be utilized to make a decision as to the location of the spare wavelength which will minimize CSO and FWM, as well as reduce the total occupied wavelength to minimize the adverse impact of Raman coupling.

In another embodiment, the spare optical transmitter can be implemented to physically replace one of the existing primary transmitters 12, 14 and 16 and be tuned to the same wavelength as the optical transmitter being replaced. In addition to tuning into the wavelength, other optical parameters including power, dispersion compensation and predistortion characteristics can be tuned so that the sparing transmitter not only operates at the same wavelength but also operates functionally equivalent to the primary transmitter that has failed and is being replaced. In such a physical-replacement scenario, a technician may be required to perform the replacement of the failed transmitter with the spare optical transmitter and configure the spare transmitter, such as through a human-machine interface. Such configuration of the spare transmitter 18, after being replaced, can occur locally at the node or headend or remotely from a central station.

FIGS. 2-6 demonstrate examples of some wavelength plans that can be utilized in a transmission system that implements sparing according to an embodiment of the invention. These examples presume that four unequally spaced, non-ITU frequency gridded channels have been selected for transmission in the O-band according to as set out in the above-incorporated Forghieri paper, having frequency offsets of 0 GHz, 200 GHz, 500 GHz and 900 GHz. In each of these examples, the four-wave mixing induced peak crosstalk is plotted as a function of frequency demonstrating two tone or two channel inter-modulation effects as squares, whereas the three-tone inter-modulation effects are depicted as circles. The information in FIGS. 2-6 further demonstrates the wavelengths implemented in a transmission system with an 8 dBm fiber launch power to at least a 20 km span of fiber. It will be appreciated that the circumstances for FIGS. 2-6 are by way of example and not by limitation as higher launch power over increased distances can be implemented based on the teachings contained herein.

Figure 2:
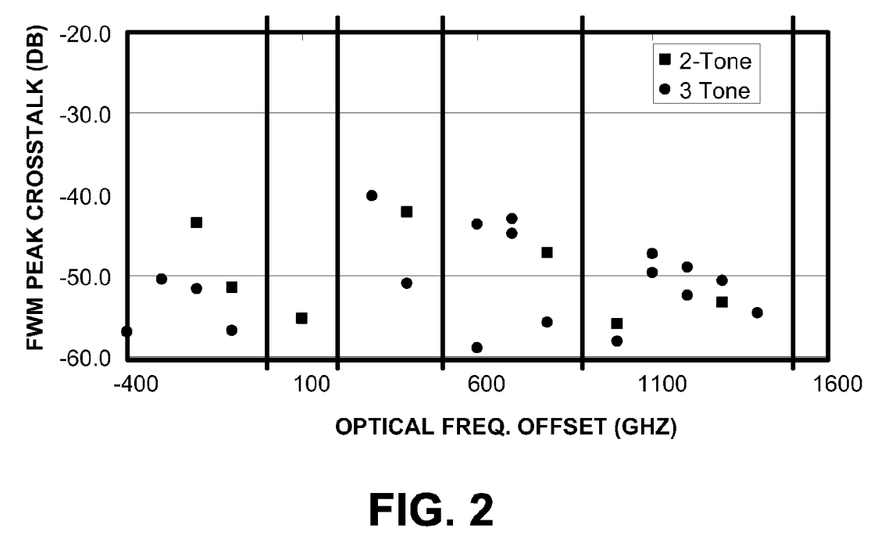
FIG. 2 is a graph depicting optical frequency offset for a first sparing strategy that can be implemented according to an embodiment of the invention.

For instance, FIG. 2 depicts an example of a wavelength plan for an O-band transmission system in which a fixed spare wavelength channel is provided for sparing any of the other primary failed channels at wavelengths of 0, 200, 500, or 900 GHz. In this example, it has been determined that a common spare can be located at 1500 GHz (or −600 GHz) to avoid the FWM beats while maintaining the smallest wavelength span. In this example, a single spare transmitter can be provided but the overall bandwidth grows from about 900 GHz for the four channel system before sparing to 1500 GHz when the spare channel is connected and tuned for operation in the transmission system. It will be understood that even though the wavelength of the spare transmitter may be fixed, additional configuring and tuning of the spare optical transmitter parameters would be implemented, such as power, dispersion compensation, predistortion or other parameters.

Figure 3:
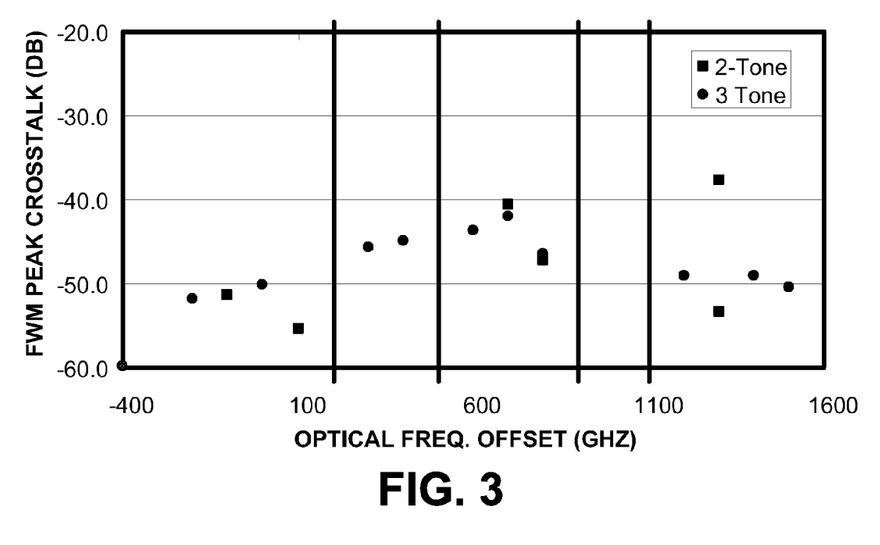
FIG. 3 is a graph depicting optical frequency offset for a second sparing strategy that can be implemented according to an embodiment of the invention.

FIGS. 3-6 depict examples when a tunable wavelength can be selected for non-uniform spaced, non-ITU gridded frequency plan in the O-band having frequency offsets at 0, 200, 500 and 900 GHz. FIG. 3 depicts an example in which the spare wavelength is selected to have a frequency offset at 1100 GHz to replace the channel having 0 GHz offset if it has failed. In this example, the total frequency span remains 900 GHz both before and after sparing.

Figure 4:
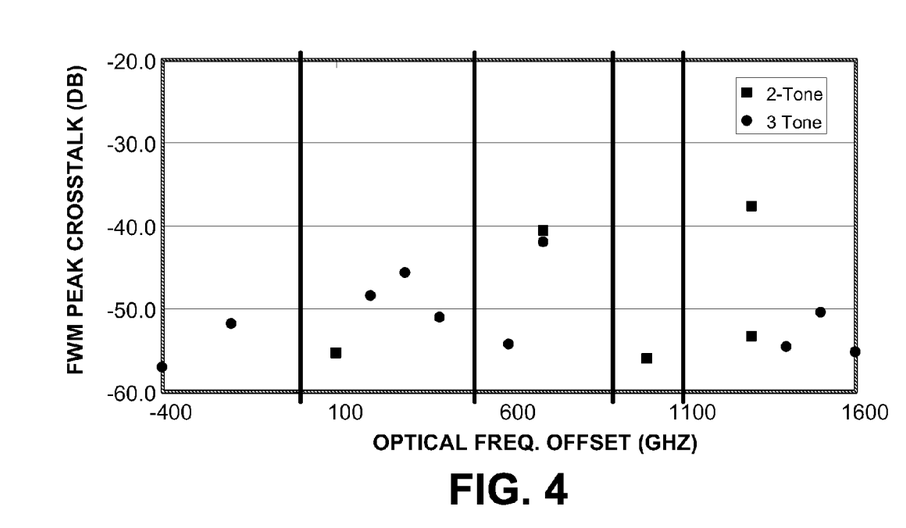
FIG. 4 is a graph depicting optical frequency offset for a third sparing strategy that can be implemented according to an embodiment of the invention.

FIG. 4 depicts an example where the 200 GHz offset channel has failed and the spare channel is provided with an optical frequency offset of 1100 GHz. In this example, the total span of the wavelength plan is about 1100 GHz after performing such sparing.

Figure 5:
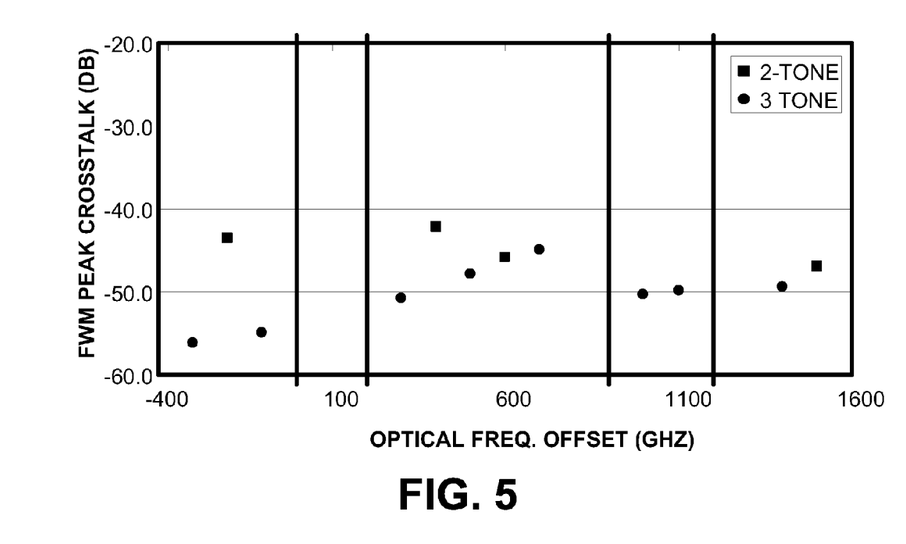
FIG. 5 is a graph demonstrating optical frequency offset for a fourth sparing strategy that can be implemented according to an embodiment of the invention.

FIG. 5 depicts an example where the spare channel is selected at 1200 GHz for a situation where the spare channel at 500 GHz has failed. In this example, the frequency span is 1200 GHz after performing such sparing.

Figure 6:
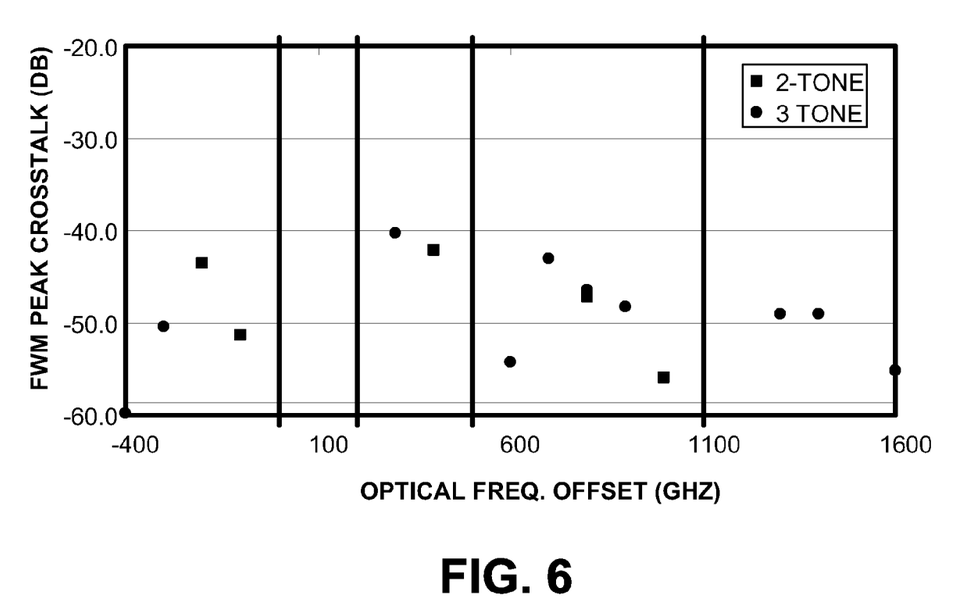
FIG. 6 is a graph depicting optical frequency offset for a fifth sparing strategy that can be implemented according to as embodiment of the invention.

FIG. 6 depicts an example where the 900 GHz channel has failed and a spare has been replaced at a frequency offset of 1100 GHz. In this example, the total frequency span is 1100 GHz after performing the sparing. Thus in the example of FIGS. 3-6, a wavelength plan with a tunable spare transmitter can be implemented in which the tunable spare is configured to operate with a frequency offset of 1100 GHz or 1200 GHz for selectively sparing any one of four primary channels that might fail. In this example the total wavelength span will tend to increase from 900 GHz for the initial primary wavelength up to a maximum of 1200 GHz as shown in the example of FIG. 5.

While the examples of FIGS. 3-6 demonstrate tuning wavelength of the spare transmitter to one of two different wavelengths depending on which primary transmitter fails, those skilled in the art will understand that the spare could be tunable to a different number of more than two wavelengths. For instance, the spare could be tunable to a selected one of four different predetermined wavelengths depending on which primary transmitter fails. Alternatively, the wavelength determination can be, such as over a continuous range of wavelengths within the O-band based on in real-time analysis of electrical and optical parameters in the distribution network.

Figure 7:
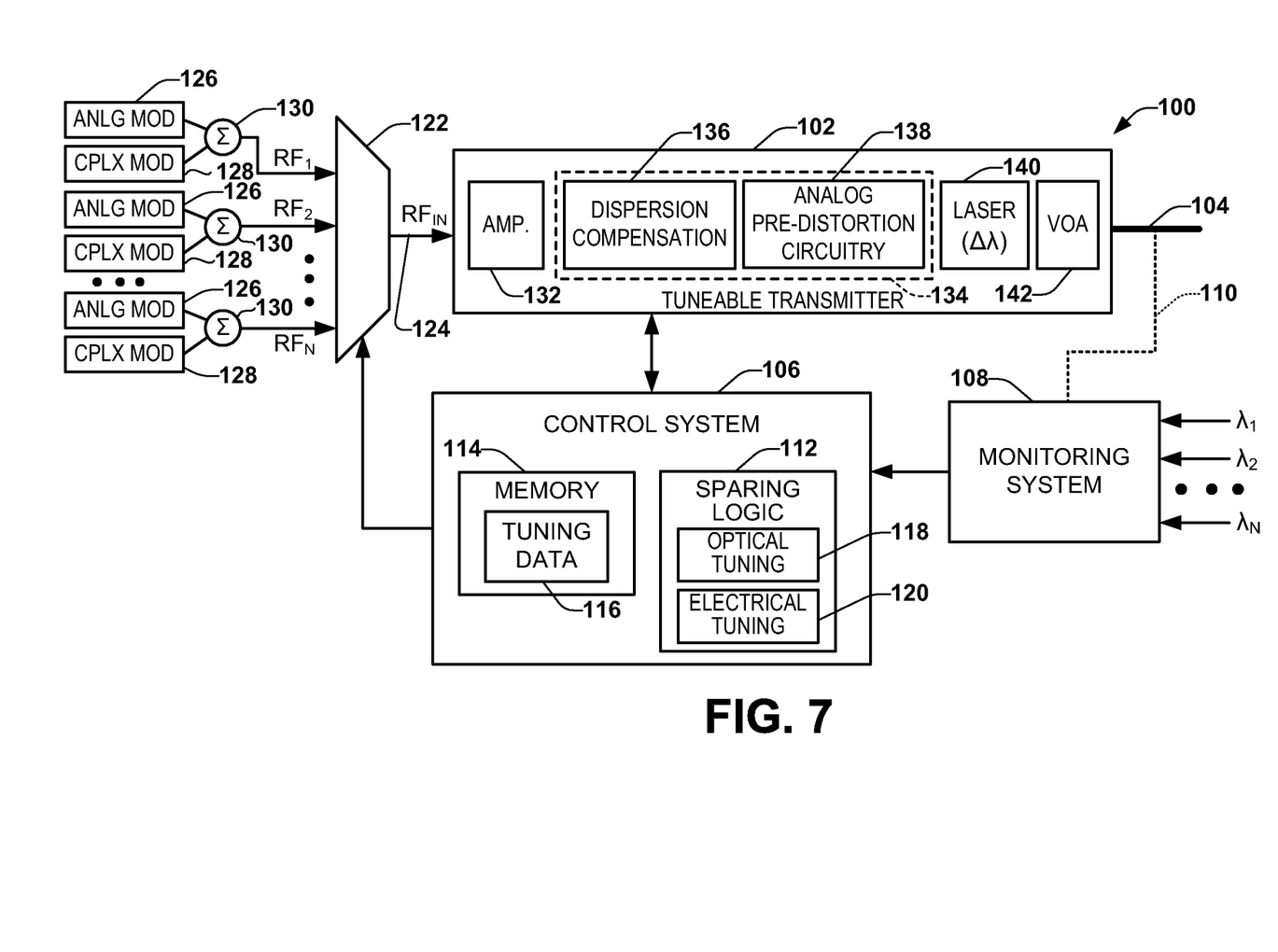
FIG. 7 depicts an example of a system for controlling a spare optical transmitter according to embodiment of the invention.

FIG. 7 depicts an example of part of an optical transmission system 100 that can be utilized implement sparing according to an embodiment of the invention. As an example, the system 100 can be implemented as part of the transmission system 10 of FIG. 1, such as may be implemented at a headend of a CATV distribution system or as a node within such a distribution system. The system 100 includes a tunable spare transmitter 102 that is configured to receive an RF input signal (e.g., $RF_{IN}$ corresponding to the RF input that is provided to a failed optical transmitter), and provide a corresponding directly modulated optical output signal provided at 104, to an associated port of an optical multiplexer.

A control system 106 is connected to control the tunable transmitter 102 in response to detecting failure in one of a plurality of primary optical transmitters. As used herein, the failure can indicate a complete failure of the optical transmitter or failure can exist when the optical transmitter has been determined to operate outside of expected operating parameters. For example, a primary optical transmitter can be considered to have failed based on monitoring any one or more of ambient temperature of operation, CNR, CSO, XMD, CTB, bit error rate (BER), noise floor, power dissipation as well as other operating parameters that can be monitored and detected.

In order to detect operating characteristics of the primary optical transmitters as well as the spare transmitter 102, the system 100 can include one or more monitoring system 108. The monitoring system 108 can be configured ascertain whether one of the primary optical transmitters has failed, such by monitoring the respective wavelengths, demonstrated at $\lambda_1$, $\lambda_2$, through $\lambda_N$. Those skilled in the art will understand that each of the wavelengths can correspond to different colors and that operating characteristics for each such channel can be monitored in the optical domain, electrical domain or in both the optical and electrical domains. The monitoring system 108 can provide an indication of failure to the control system 106 for a given channel as a function of monitoring the wavelengths to enable appropriate tuning of the tunable transmitter 102. The monitoring system 108 can also be configured to monitor operating characteristics associated with one or more of the other primary optical transmitters (not shown) in the transmission system 100 as well as operating characteristics of the tunable transmitter 102. The operating characteristics can include optical parameters as well as electrical parameters or a combination of electrical and optical parameters, which can be monitored at the launch side or receive side of the fiber link. The monitoring system 108 thus can provide distributed feedback about the operation of the transmission system 100, including, for instance, an indication of the monitored signal characteristics based on which the control system 106 controls tunable parameters of the spare transmitter 102.

As one example, the monitoring system 108 can be configured to monitor the optical signal at the launch side of the fiber length, indicated at dotted line 110. For example, the monitoring system 108 can be implemented as including a polarimeter that is coupled proximal the launch side of the optical fiber via an optical tap. The polarimeter can be programmed and/or configured to detect chromatic and/or polarization mode dispersion, such as in the output 104 or in the fiber at the output of the optical multiplexer in a transmission system (see, e.g., FIG. 8). The monitoring system 108 thus can provide the control system 106 with an indication of polarization mode dispersion. Additionally or alternatively, the monitoring system 108 can be coupled to the optical fiber near the receive end thereof to monitor optical parameters associated with the transmission of DWDM signals through the fiber.

The monitoring system 108 can also include one or more spectrum analyzer, such as for monitoring and analyzing channels in the optical domain, the electrical domain or in both the electrical and optical domains. For instance, the spectrum analyzer can be implemented as an optical spectrum analyzer that is coupled to the fiber link via an optical tap for monitoring characteristics of the optical spectrum, such as wavelength amplitude. The optical spectrum analyzer can thus provide the control system with an indication of spectrum properties, including an indication of optical crosstalk, optical signal to noise ratio (OSNR), an indication of relative intensity noise (RIN), dispersion in the fiber as well as other optical properties. The optical spectrum analyzer or another part of the monitoring system 108 can also perform data analysis with respect to the DWDM waveforms transmitted over the optical fibers. The results of such analysis and other information can be provided to the control system 106 for use in controlling the tunable spare transmitter 102.

Additionally or alternatively, the monitoring system 108 may also include an RF spectrum analyzer that is programmed and/or configured to monitor the RF spectrum, analyze properties thereof and provide an indication of one or more characteristics associated with the RF spectrum. For example, the RF spectrum analyzer can be coupled to monitor the RF output at a receive end of an associated distribution system (see, e.g., FIG. 9). The results of such monitoring can be provided back to the control system 106 such as corresponding to an indication of the noise on the signal for each of the transmission channels, the distortions present along with their levels, or the presence of any spurious, undesirable interference on the received signal.

The monitoring system 108 can also include a QAM spectrum analyzer that is programmed and/or configured to monitor one or more parameters for the QAM signals at the receive end. For instance, the QAM spectrum analyzer can provide an indication of modulation error ratio (MER) for each channel that is monitored. The results of such monitoring (e.g., a value indicative of the MER) can be provided back to the control system 106 such as corresponding to an indication of the noise on the signal for each of the transmission channels. The QAM analyzer can also provide an indication of the bit error ratio (BER). For instance, the QAM analyzer may provide an indication of BER before forward error correction (Pre-FEC) and after (Post-FEC)) according to any FEC algorithm, if utilized, for each channel that is monitored. Information about the channel response (e.g., channel power) can also be provided by the QAM analyzer. The. The results of such monitoring (e.g., values indicative of Pre-and Post-FEC BER) can be provided back to the control system 106 such as corresponding to an indication of the errors induced in the transmission of the signal for each of the transmission channels. The results can also include other parameters detected by the QAM modulator, such as including an indication of the channel response for each channel that is monitored.

Those skilled in the art will understand and appreciate the various means for monitoring noise and other effects of four-wave mixing that can be monitored automatically or manually to provide an indication of such monitored conditions to the control system 106.

The control system 106 includes sparing logic 112 that is programmed and/or configured to determine a set of one or more tuning parameters that are to be provided to the tunable transmitter 102 if a primary optical transmitter fails. For instance, the sparing logic 112 can determine a wavelength for the transmitter 102 depending on which of the primary wavelengths the monitoring system 108 has indicated to have failed. The sparing logic 112 can also determine a launch power for the tunable transmitter as well as set additional operating parameters for the transmitter 102, such as including predistortion, dispersion compensation and optical attenuation to be implemented thereby.

As one example, the monitoring system 108 can provide the control system 106 with an indication of power as well as identify the failed wavelength or channel. The monitoring system 108 can also be configured to provide the control system 106 with an indication of other operating characteristics, which can include optical effects in the optical domain as well as RF characteristics in the electrical domain.

In one embodiment, the control system 106 can include memory 114 that includes a set of tuning data 116. For instance, the identified wavelength and power of the failed laser (e.g., based measurements before its failure) can be utilized as an index to a look up table (LUT) stored in the memory 114. The LUT in the memory 114 in turn can provide tuning parameters for the transmitter 102 depending on the wavelength and power. The tuning parameters can include a wavelength and power (e.g., launch power) that are utilized to configure the spare transmitter 102. The control system 106 can provide such tuning parameters in a sparing control signal that includes coefficients having values set to establish the launch power and wavelength of the transmitter 102. For example, the control system 106 can control the tunable transmitter to operate with a tunable power ranging from about 3 dBm to about 13 dBm (e.g., corresponding to 2 milliwatts to 20 milliwatts of power, respectively). In addition to providing the appropriate power level according to the power of the failed transmitter, correction coefficients can be set depending on the selected power, such as including dispersion compensation and predistortion. For instance, a set of respective correction coefficients can be stored in the memory 114 for each available level of power to which the transmitter 102 can be tuned.

By way of further example, the sparing logic 112 can employ a tuning algorithm, which is depicted as including an optical tuning component 118 and an electrical tuning component 120. The optical tuning component 118 can be programmed to tune one or more parameters in the optical domain, such as wavelength of the transmitter, attenuation or other optical parameters. The tuning can be performed by the sparing logic 112 in place of or in addition to the tuning obtained via the LUT in the memory 114. The optical tuning component 118 can control such optical parameters based on an indication of optical effects provided by the monitoring system 108. The electrical tuning component 120 can be programmed to adjust electrical parameters in the RF domain, such as based on an indication of electrical effects (e.g., RF crosstalk, CNR, CSO, CTB, XMD) provided by the monitoring system 108. The tuning of the transmitter by the optical tuning component 118 and the electrical tuning component 120 can be implemented as a single instance of tuning.

Alternatively, the tuning can be performed as an iterative process, such as according to methods employed by the optical and electrical tuning components 118 and 120 during a calibration phase. For example, the optical tuning component 118 can be programmed to determine a spare wavelength as a function of the failed wavelength channel (and/or as a function of the remaining viable wavelength channels). Such tuning can include wavelength tuning in which the wavelength is varied incrementally from an initial wavelength to identify a corresponding spare wavelength that mitigates crosstalk due to FWM and other CSO effects. Such calibration can be performed by sending a test RF signal to the spare transmitter 102 and through the fiber link in combination with signals being provided by the remaining optical transmitters (which may include test signals or normal traffic). The monitoring system 108 further can provide feedback that can be utilized to perform tuning in the electrical domain, such as by adjusting correction coefficients to meet system specifications and suppress the CSO effects of distortion as well as to maximize the CNR within a desired minimum wavelength spread over the fiber.

The system 100 includes a switch (a multiplexer) 122 that is configured to selectively provide a desired RF input ($RF_{IN}$) signal to an input 124 of the tunable transmitter 102. The RF input can correspond to a selected one of a plurality of RF inputs ($RF_1$, $RF_2$ through $RF_N$) including the set of inputs provided to the primary transmitters. Additionally or alternatively, one of the inputs can be a test channel that can be utilized for performing tuning functions of the spare transmitter 102, such as during a calibration phase. The control system 106 provides a selection signal to control which of the RF inputs is coupled to the input 124 of the transmitter 102, such as described herein.

In the example of FIG. 7, each of the RF input signals ($RF_1$, $RF_2$ through $RF_N$) can be provided by a respective modulator. For instance, each input to the multiplexer 122 can correspond to an input from either an analog modulator 126 or a complex modulator 128. A combiner 130 is coupled to receive respective inputs from the analog modulator 126 and complex modulator 128 and to provide the respective RF input signal $RF_1$, $RF_2$ through $RF_N$ to the multiplexer 122. As an example, each of the analog modulators 126 can correspond to a National Television System Committee (NTSC) modulator, a Phase Alternating Line (PAL) modulator, or a Sequential Color with Memory (SECAM) modulator. As an alternative example, the analog modulators 126 can be replaced by digital television signal broadcast modulators (DSB) such as that specified by the Advanced Television Standards Committee (ATSC) eight level vestigial sideband system (8-VSB) or one employing coded orthogonal frequency division multiplexed (COFDM) digital television signals. The complex modulators can be implemented as QAM modulators or as other types of complex modulators. As used herein, complex modulation refers to modulation of a signal that involves variation of more than one parameter, such as modulation of amplitude and phase or amplitude and frequency. By way of example and not by way of limitation, complex modulation schemes implemented by the complex modulators 128 can include 16-QAM, 64-QAM, 128-QAM, 256-QAM, 16-PSK, 16-APSK and the like.

The transmitter 102 includes an amplifier 132 that is configured to amplify the RF input signal ($RF_{IN}$) to provide an amplified RF input signal to RF correction circuitry 134. The amplifier 132 can electrically amplify the RF input signal to a desired level, such as according to a gain thereof. The gain of the amplifier 132 may vary according to a gain coefficient provided by the control system 106.

In the example of FIG. 7, the RF corrections circuitry 134 includes dispersion compensation circuitry 136 as well as analog predistortion circuitry 138. It will be appreciated that such circuitry 134 can be pre-tuned by the manufacturer for a set of initial expected operating conditions. The dispersion compensation circuitry 136 and the analog predistortion circuitry 138 can further provide varying level of correction in the electrical domain based on coefficients provided by the control system 106 as described above. The RF correction circuitry 134 can be tuned based on monitored characteristics for the electrical domain, the optical domain or based on monitored characteristics in both the electrical and optical domains.

The dispersion compensation circuitry 136 provides for electrical compensation of signal distortion such as caused by laser chirp and fiber dispersion. The amount of compensation can be set (e.g., by correction coefficients determined by the electrical tuning component 120 of the control system 106) based on the degree of dispersion detected by the monitoring system (e.g., an optical spectrum analyzer or the like). Such compensation further can be adjusted dynamically during operation by periodically or intermittingly monitoring polarization mode dispersion or other dispersion characteristics (e.g., state of the signal and time delays) associated with the WDM signals on the fiber link. While the dispersion compensation is shown and described as electronic dispersion compensation that operates on the RF signal (e.g., in the electrical domain), it will be appreciated that such dispersion compensation can alternatively or additionally be performed on the optical output signal (e.g., in the optical domain), such as by employing a dispersion shifted fiber, chirped fiber Bragg grating, virtually imaged phase arrays as well as other types of dispersion compensation units.

The analog predistortion circuitry 138 can produce composite second order, composite triple beat, and cross-modulation distortion correction of a laser 140 of the transmitter. The predistortion circuitry 138 can be configured according to a feedforward technique, a multipath predistortion technique as well as to provide in-line predistortion of the RF signal. Alternatively, the distortion correction can be carried out optically, via an optical correction element within the optical path. The tuning of the analog predistortion circuitry 138 can be performed based on correction coefficients determined by the electrical tuning component 120 of the sparing logic 112.

The laser 140 receives the compensated and predistorted signal from the correction circuitry 134 and in turn generates a corresponding optical signal by directly modulating the analog intensity of the RF signal. In the example of FIG. 7, the laser is depicted as a tunable wavelength laser (indicated by $\Delta\lambda$). For instance, the laser 140 can be implemented as a single-frequency lasers can be continuously tuned over a certain range, the laser can be tuned to a set of discrete wavelengths or exhibit mode hops when being tuned over a larger range or wavelengths (e.g., a wavelength agile laser). The wavelength tuning of the laser 140 can be performed in different ways (e.g., thermal tuning, phase tuning, microelectrical-mechanical system (MEMS) or by stepper means), which varies depending on the type of laser, to provide the output optical signal at the desired wavelength. The laser 140 thus provides the optical signal at a corresponding spare wavelength based on tuning information from the control system 106.

As a further example, the laser 140 can be implemented as a semiconductor laser (e.g., a laser diode) that directly modulates the corrected $RF_{IN}$ signal to produce the optical output signal at the desired spare wavelength in the O-band and corresponding power level. As mentioned herein, the $RF_{IN}$ signal can be a complex modulated waveform corresponding to the input to the failed transmitter. The wavelength can be tuned, such as by thermal, phase, or MEMS tuning of laser 140 or by controlling the drive current. Such tuning can be performed based on coefficients determined by the optical tuning component 118 and/or via LUT in the memory 114. The laser 140 provides the optical output signal at 104 to a corresponding optical port of the optical multiplexer (e.g., 20 of FIG. 1) for distribution over a corresponding single mode fiber link (e.g., 22 of FIG. 1).

A variable optical attenuator 142 can also be utilized to incrementally adjust the power of the optical signal provided by the transmitter 102. For instance, the variable optical attenuator 142 can be provided to allow for variations in laser bias current in order to maintain operation at a condition of optimal linearity (the so-called "sweet spot"), while still maintaining a pre-determined, constant optical power into the fiber at the output of the transmitter module. The variable optical attenuator 142 can be implemented at the output of the optical transmitter 102 or it may be integrated into the transmitter 102. For example, the tunable transmitter 102 can be implemented as a printed circuit board module that can be electrically connected into a corresponding spare slot at the transmission system 100.

Those skilled in the art will understand and appreciate various types and configurations of dispersion compensation circuitry 136 and analog predistortion circuitry 138 that can be implemented in the transmitter 102. As one example, U.S. Pat. No. 5,436,749, which is entitled *Method and Apparatus for Predistortion*, discloses predistortion circuitry that operates in the electrical domain. As another example, distortion correction can be implemented in the optical domain, such as shown and described in U.S. Pat. No. 6,538,789, which is entitled *Optical Linearizer for Fiber Communications*. Embodiments of such circuitry and transmitter modules are also commercially available, for example, from Finisar Corporation of Sunnyvale, Calif., and Emcore Corporation of Alhambra, Calif., as well as from other vendors in the U.S. and throughout the world.

Figure 8:
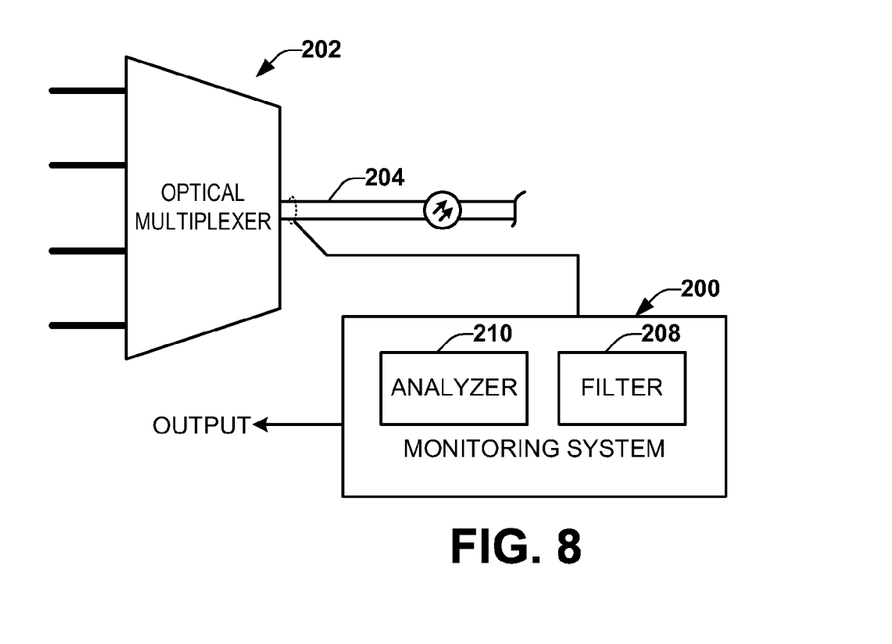
FIG. 8 depicts an example of a monitoring system that can be utilized to control an optical transmission system according to embodiment of the system.

FIG. 8 depicts an example of a monitoring system 200 that can be coupled to monitor an optical output of a transmission system 202. For instance, the monitoring system 200 is coupled via an optical tap to the fiber link 204 adjacent the output of the optical multiplexer 206. The monitoring system 200 can monitor directly in the core of the fiber link 204 to mitigate disruption of the optical data signals. The monitoring system 200 can include a filter 208 that is configured to monitor wavelengths in the O-band region, including unequally spaced apart channels. An analyzer 210 is configured to monitor the filtered optical signals and provide output data indicative of spectral characteristics. The spectral characteristics can include an indication of wavelength amplitude, dispersion, optical power, optical noise and other optical characteristics that can be determined by the monitoring system 200 for each channel or can be computed for the entire wavelength span. This output data can be provided as feedback to a control system for controlling operation the optical transmission system 202, such as described herein with respect to FIG. 7.

Figure 9:
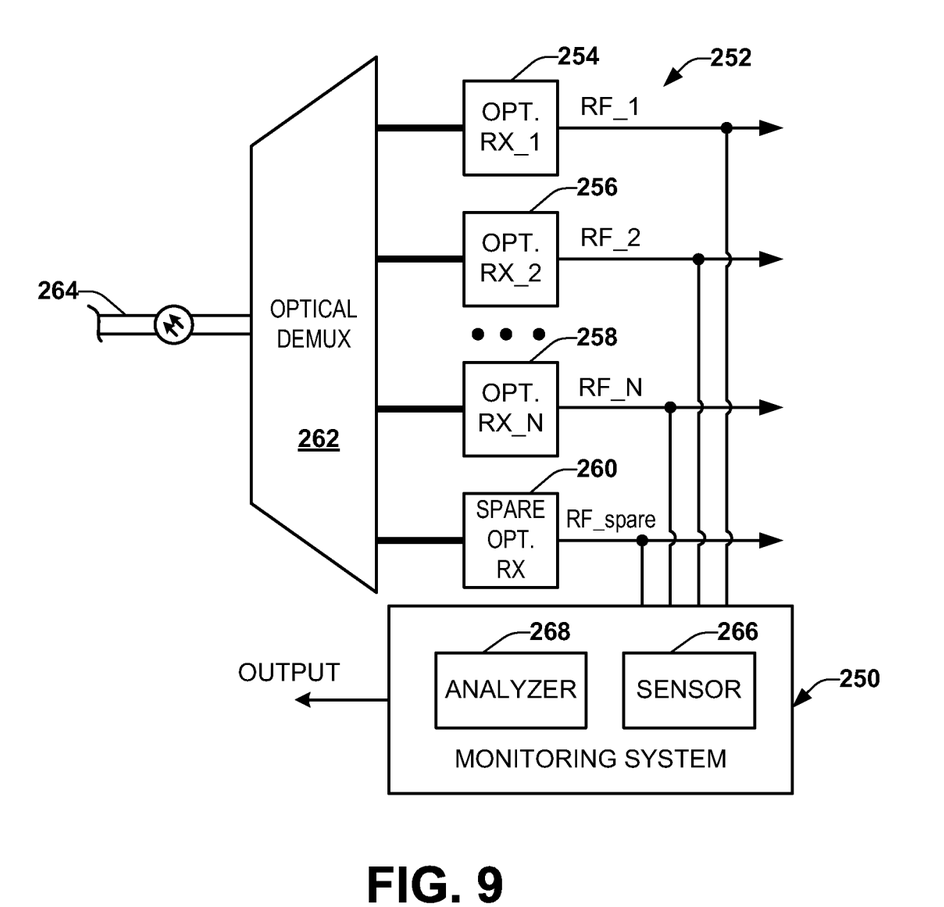
FIG. 9 depicts another example of a monitoring system that can be utilized to control an optical transmission system according to an embodiment of the system.

FIG. 9 depicts an example another type monitoring system 250 that is coupled to a portion of a receiver system 252. In the example of FIG. 9, the monitoring system 250 receives as inputs electrical signals provided at the outputs of optical receivers of the receiver system 252, including RF_1, RF_2 and RF_N provided by corresponding optical receivers 254, 256 and 258. The monitoring system can also monitor the output of signal of a spare optical receiver 260, which is tunable to receive and convert the spare optical signal that is generated by a spare transmitter to a corresponding electrical signal (RF_spare). Thus, in response to detecting a failure, the spare optical receiver is utilized to provide the RF_spare signal in place of the failed channel.

The receiver system 252 further includes an optical demultiplexer 262 that receives the multi-wavelength signal on a fiber link 264 from an associated transmission system (e.g., the system 10 of FIG. 1). The wavelength spacing, transmit power and correction parameters for each N wavelength can be controlled by a transmitter control system, such as described herein. The monitoring system 250 includes a sensor 266 that is configured to sense characteristics associated with each of the RF signals (e.g., RF_1, RF_2, RF_N and RF_spare). An analyzer 268 is programmed and/or configured to monitor the sensed signal content and quantity the measurements to a format and structure that is recognizable by the transmission control system. Since the signals are RF signals, the signals can be monitored for signal to noise content, optical modulation index, and spectral noise density.

The monitoring system 250 can send output data corresponding to the analyzed signals in a message back to the transmission control system, such as through a reverse control channel or other type of communication link. The type of information can vary depending on the type of analyzer 268 implemented by the monitoring system 250. For instance, the analyzer 268 can be implemented as an RF analyzer (e.g., providing an indication of RF crosstalk, CNR, CSO, CTB, or XMD) or a QAM analyzer (e.g., providing MER data), such as described herein. The information can be provided automatically to the control system periodically or intermittently or in response to a polling request from the transmission control system for the monitored output data. As described herein, the transmission control system can employ one or more algorithm to determine operating characteristics for the spare transmitter, including wavelength, power and correction parameters. The control system can further employ the monitored information as feedback for additional correction, which can be applied to the spare transmitter as well as to perform additional tuning of the remaining primary optical transmitters.

Figure 10:
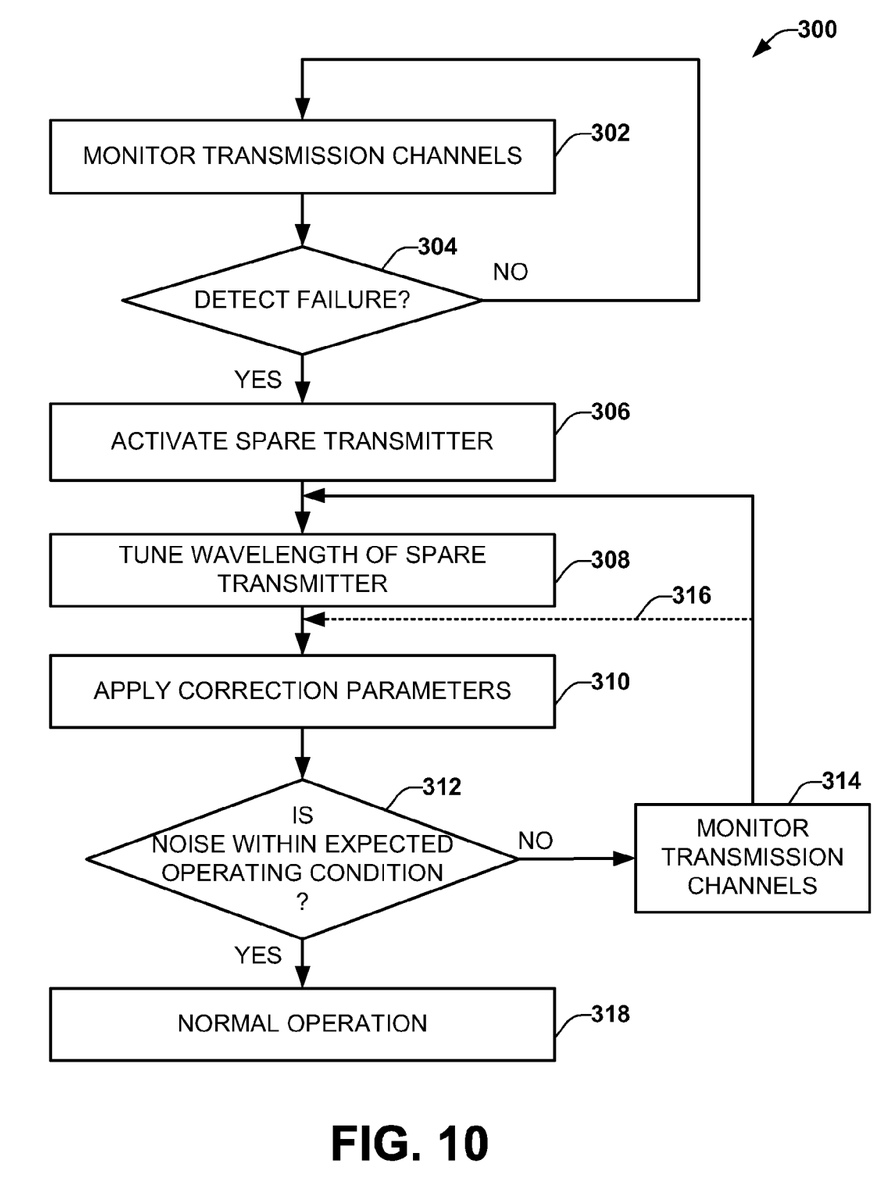
FIG. 10 is a flow diagram depicting a method for implementing sparing according to an embodiment of the invention.

In view of the structural and functional features described above, a method 300 will be better appreciated with reference to FIG. 10. It is to be understood and appreciated that the illustrated actions, in other embodiments, may occur in different orders or concurrently with other actions. Moreover, not all features illustrated in FIG. 10 may be required to implement a method according to the subject invention. It is to be further understood that the following methodology can be implemented in hardware (e.g., in a FPGA, or in one or more processors, such as in an ASIC or a computer), software (e.g., stored in a computer readable medium or as executable instructions running on one or more processors), or as a combination of hardware and software.

The method 300 begins at 302 in which the transmission channels are monitored. The channels as described herein can correspond to individual wavelengths or colors in the optical fiber in the optical domain or to the resulting channels after being received and converted back to corresponding RF signals in the electrical domain. As described herein, at least one of the transmission channels is used to transmit a complex modulated RF signal. The monitoring at 302 can include monitoring of optical as well as electrical signals at the receive end as well at the transmission end as described herein.

A determination is made at 304 as to whether a failure of one of the optical channels has been detected. If a failure is detected (YES), the method proceeds to 306 in which the spare transmitter is activated to produce a corresponding optical output signal at the spare wavelength. To facilitate such operation and power-up, the spare transmitter may operate partially powered up in a stand-by mode. In the event a failure is not detected (NO), the method may return to 302 and repeat the monitoring process. Such monitoring may be intermittently or periodically performed. Those skilled in the art will understand and appreciate various approaches that can be utilized to detect failure of an optical transmitter, which may be based on monitoring operation at the transmission side, the receiver side or both.

The spare transmitter is tuned based on monitoring performed for the optical signals. At 308, the tuning can including tuning to a desired one of a plurality of predetermined non-uniformly spaced wavelengths in the O-band. The tuning can also include adjusting the launch power of the spare optical transmitter as well as tuning additional correction parameters, including predistortion, dispersion compensation, and optical attenuation, as indicated at 310. The spare wavelength and other tuning parameters can be determined in dependence on the wavelength of the failed channel. The parameters, for example, can be selected from a preprogrammed look-up table programmed to provide such parameters based on an identification of the failed channel as well as other monitored characteristics. Alternatively, the parameters may be computed by a control algorithm based on an identification of the failed channel as well as other monitored characteristics.

A determination is made at 312 as to whether the system is operating within expected conditions. This determination at 312 can be made, for example, based on monitoring the CNR and/or CSO distortion, such as due to FWM induced products. If the noise is not within expected operating condition (NO) the method proceeds to 314 in which operating characteristics of the system are monitored as feedback for the tuning process. From 314, the method returns to 308 for additional tuning the spare optical transmitter, such as including additional wavelength tuning and (at 310) application of additional correctional parameters. Additional tuning may also be performed with respect to the remaining plurality of primary optical transmitters. The method 300 can loop repeatedly through 308-314 during a calibration phase or to perform periodic adjustments. As an alternative, from 314 the method may return to 310 for applying additional correction based on the monitoring of the transmission channels. If the system is determined to be operating within expected operating conditions, the method proceeds from 312 to 318 to continue normal operation of the transmission system.

It will be understood and appreciated that the spare optical transmitter is operated and tuned to be functionally equivalent in the system to the failed transmitter that it is replacing. The activation of the spare transmitter may also be utilized to trigger an alarm system so that appropriate technical personnel can be informed automatically or manually so that additional corrective action may be taken on an as-needed basis.

What have been described above are examples and embodiments of the invention. It is, of course, not possible to describe every conceivable combination of components or methodologies for purposes of describing the invention, but one of ordinary skill in the art will recognize that many further combinations and permutations of the present invention are possible. Accordingly, the invention is intended to embrace all such alterations, modifications and variations that fall within the scope of the appended claims. In the claims, unless otherwise indicated, the article "a" is to refer to "one or more than one."

What is claimed is:

1. A multi-wavelength optical transmission system comprising:
    a plurality of primary optical transmitters, each being configured to provide directly modulated analog optical signals at non-uniformly spaced apart wavelengths;
    an optical multiplexer having a plurality of optical input ports that receive the analog optical signals from each of the plurality of primary optical transmitters and to provide a wavelength division multiplexed signal over an optical fiber coupled at an output thereof; and
    a spare optical transmitter that is coupled to an input port of the optical multiplexer and, in response to detecting failure of a failed one of the plurality of primary optical transmitters, is tuned to provide a directly modulated analog optical signal at a spare wavelength that is selected as to be non-uniformly spaced relative to at least some of the non-uniformly spaced apart wavelengths according to tuning data, wherein the spare optical transmitter is configured to tune to the spare wavelength corresponding to one of a plurality of predetermined different wavelengths that varies depending on which of the plurality of optical transmitters is determined to have failed, wherein the plurality of predetermined different wavelengths are different from the non-uniformly spaced apart wavelengths of the plurality of primary optical transmitters.

2. The system of claim 1, further comprising a control system programmed to provide a sparing control signal in response to detecting failure of the failed one of the plurality of primary optical transmitters, the spare optical transmitter being tuned based on the sparing control signal.

3. The system of claim 2, further comprising:
    correction circuitry configured to adjust a radio frequency (RF) input signal that is provided to the spare optical transmitter in response to at least a portion of the sparing control signal, the correction circuitry providing a corrected RF signal; and a laser that directly modulates the corrected RF signal to provide the directly modulated analog optical signal at the spare wavelength.

4. The system of claim 3, wherein the correction circuitry further comprises analog predistortion circuitry configured to substantially linearly predistort and correct composite second order distortion associated with the optical signal provided by the spare optical transmitter.

5. The system of claim 3, wherein the correction circuitry further comprises dispersion compensation circuitry that is configured to correct for optical dispersion effects associated with at least the directly modulated analog optical signal provided by the spare optical transmitter.

6. The system of claim 2, wherein the spare optical transmitter is integrated on a printed circuit board which comprises:

an amplifier configured to amplify a complex modulated RF input signal to provide an amplified RF signal corresponding to the RF input signal of the one of the first plurality of optical transmitters that has failed;

correction circuitry that dynamically adjusts the amplified RF signal to provide a corrected RF signal; and a laser configured to directly modulate the corrected RF signal at a wavelength in the O-band, corresponding to the directly modulated analog optical signal at the spare wavelength, the optical multiplexer combining the directly modulated analog optical signal with a remaining portion of the other analog optical signals for transmission as the wavelength division multiplexed signal over the optical fiber.

7. The system of claim 2, further comprising a monitoring system for detecting failure of a failed one of the plurality of first optical transmitters and providing an output signal indicative of the detected failure, the control system providing the sparing control signal to the spare optical transmitter based on the output signal from the monitoring system.

8. The system of claim 7, wherein the sparing control system further comprises memory implementing a look-up table, the monitoring system providing an indication of the wavelength and power of the failed one of the plurality of optical transmitters, which defines at least a portion of an index to the look-up table, the look-up table being programmed to provide an indication of a selected one of a plurality of different spare wavelengths and power for operating of the spare optical transmitter depending on the index to the look-up table.

9. The system of claim 8, wherein the memory further stores a set of at least one correction coefficient associated with each of a plurality of different launch powers for the spare optical transmitter, a selected one of the at least one correction coefficient being provided in the sparing control signal for tuning correction circuitry of the spare optical transmitter.

10. The system of claim 7, wherein the monitoring system further comprises an analyzer for analyzing at least one of optical characteristics of the wavelength division multiplexed signal over the optical fiber and signal characteristics of at least one radio frequency signal corresponding to at least one channel portion of wavelength division multiplexed signal, the analyzer providing an indication of the analyzed characteristics to the sparing control logic.

11. The system of claim 1, wherein there are four first plurality of optical transmitters and a single spare optical transmitter, the system further comprising a switch coupled to receive each of a plurality of radio frequency input signals that are provided as input signals to each of the first plurality of optical transmitters, the switch being controlled to selectively provide the radio frequency input signal for the first plurality of optical transmitters that is determined to have failed.

12. A transmission system for providing dense wavelength division transmission of unequally spaced wavelengths in the O-band over a single optical fiber of a cable television distribution plant, the system comprising:

a plurality of primary optical transmitters, each of the primary optical transmitters receiving a respective radio frequency (RF) input signal and directly modulating the RF input signal to a corresponding one of the unequally spaced wavelengths in the O-band;

a switch that is connected to receive each of the RF input signals, the switch selectively connecting the RF signal input for a given one of the plurality of primary optical transmitters to a switch output of the switch; and a tunable spare optical transmitter connected to receive the RF signal at the switch output, the spare optical transmitter being controlled to operate in response to detecting a failure in one of the plurality of primary optical transmitters, the spare optical transmitter being configured to directly modulate the RF signal at the switch output in response to a sparing control signal to provide a corresponding analog optical signal at an output thereof at a selected one of a plurality of predetermined different wavelengths in the O-band at a power level that depends on the sparing control signal, the sparing control signal varying based on which of the plurality of primary optical transmitters the failure has been detected, wherein the tunable spare optical transmitter is configured to tune to one of the plurality of predetermined different wavelengths that varies based on the sparing control signal, wherein the plurality of predetermined different wavelengths are different from the unequally spaced apart wavelengths in the O-band of the plurality of primary optical transmitters.

13. The system of claim 12, further comprising:

a monitoring system for detecting failure of a failed one of the plurality of primary optical transmitters and providing an output signal indicative of the detected failure; and a sparing control system for providing the sparing control signal to the spare optical transmitter based on the output signal from the monitoring system.

14. The system of claim 13, further comprising memory programmed with tuning data, the monitoring system providing an indication of the wavelength and power for the failed one of the plurality of primary optical transmitters, the memory being programmed to provide an indication of a selected one of a plurality of different spare wavelengths and corresponding power level for operating of the spare optical transmitter depending on the indication of wavelength and power provided by the monitoring system.

15. The system of claim 13, wherein the spare optical transmitter further comprises correction circuitry that is configured, in response to the sparing control signal, to electronically adjust the RF input signal received by the spare optical transmitter from the switch output.

16. The system of claim 15, wherein the correction circuitry further comprises at least one of (i) analog predistortion circuitry configured to linearly predistort the RF input signal received by the spare optical transmitter from the switch output based on the sparing control signal and (ii) dispersion compensation circuitry that is configured to correct for optical dispersion effects in the RF input signal received by the spare optical transmitter from the switch output.

17. The system of claim 12, wherein at least one of he RF input signals is a complex modulated RF input signal.

18. A method for sparing a plurality of O-band optical transmitters in a cable distribution plant, each of the O-band optical transmitters receiving a respective complex modulated radio frequency (RF) input signal and directly modulating the RF input signal to a corresponding analog optical signal, each of the corresponding analog optical signals having unequally spaced wavelengths in the O-band, the method comprising:
  detecting a failure in one of the plurality of O-band optical transmitters;
  activating a spare optical transmitter to receive the RF input signal provided to the failed one the plurality of O-band optical transmitters;
  tuning the spare optical transmitter based on feedback to directly modulate the RF input signal provided to the failed one the plurality of O-band optical transmitters to provide an analog optical signal having a spare wavelength in the O-band, wherein the spare wavelength is selected from a plurality of predetermined different wavelengths and the spare wavelength varies depending on which of the first plurality of optical transmitters is determined to have failed, wherein the plurality of predetermined different wavelengths are different from the unequally spaced apart wavelengths in the O-band of the plurality of O-band optical transmitters.

19. The method of claim 18, further comprising:
  monitoring transmission channels to provide the feedback; and
  applying correction parameters to correction circuitry of the spare optical transmitter to at least one of mitigate dispersion and adjust linear predistortion of the RF input signal that is directly modulated by the spare optical transmitter.

20. The method of claim 19, wherein the tuning further comprises tuning a power level of the optical transmitter based on a power detected for the failed one the plurality of O-band optical transmitters, the correction parameters varying based on the power detected for the failed one the plurality of O-band optical transmitters.

* * * * *